United States Patent Office 3,595,843
Patented July 27, 1971

3,595,843
VANADIUM COORDINATION CATALYSTS
James R. Huerta and Amos R. Anderson, Adrian, and
Jeffrey G. Meyer, Chelsea, Mich., assignors to Dart
Industries, Inc., Los Angeles, Calif.
No Drawing. Filed July 31, 1969, Ser. No. 846,606
Int. Cl. C08f 3/04, 15/04, 15/40
U.S. Cl. 260—80.78
21 Claims

ABSTRACT OF THE DISCLOSURE

The reaction product of a vanadium oxide such as vanadium pentoxide and an organophosphate such as triethyl phosphate in the presence of oxygen or an oxygen-containing gas such as air when combined with an organoaluminum halide results in a very active vanadium coordination catalyst. This catalyst is especially useful in the production of "EP" and "EPDM" rubber.

BACKGROUND OF THE INVENTION

(1) Field of the invention

This invention is directed to a novel composition of matter and a process for its synthesis, a novel catalyst which includes this composition and a process using the catalyst. More particularly, the invention relates to a vanadium-containing catalyst component which when combined with an organoaluminum halide component results in a highly active catalyst for the preparation of polymers of alpha-olefins and copolymers of alpha-olefins, and terpolymers of the alpha-olefins and a nonconjugated diene.

(2) Description of the prior art

Transition metal compounds of various types have been disclosed in the prior art; see U.S. Pat. Nos. 3,113,115; 3,297,733 and 3,361,779. Of the organometallic compounds disclosed, particular attention has been given to those in which the transition metal constituent is vanadium; see U.S. Pat. Nos. 3,294,828 and 3,361,778. Coordination catalysts containing a vanadium organometallic compound, e.g., vanadium tetrachlorides and vanadium oxytrichlorides, and a compound capable of reducing the vanadium to a valance state of less than 3, such as the organoaluminum compounds, have long been of interest for use as polymerization catalysts; see U.S. Pat. No. 2,962,451. This interest in developing novel vanadium-containing coordination catalysts is evidenced by the considerable number of recent patents on the subject; see, for example, U.S. Pat. Nos. 3,392,160; 3,396,155 and 3,427,257. Particular attention has been shown in the preparation of alpha-olefin polymers, copolymers of alpha-olefins, e.g., ethylene/propylene (EP) rubber, and the terpolymers of the alpha-olefins with the nonconjugated dienes, e.g., ethylene/propylene/diene terpolymers, (EPDM) rubber. Vanadium coordination catalysts have been disclosed as having activity for the preparation of EP and EPDM rubber; see U.S. Pat. Nos. 3,166,517 and 3,234,383.

SUMMARY OF THE INVENTION

The present invention provides a novel catalyst component comprising the reaction product of a vanadium oxide and an organophosphate in the presence of oxygen or an oxygen-containing gas comprising a mixture of oxygen and an inert gas. The latter must be inert to the reaction between the vanadium oxide and the organophosphate, e.g., nitrogen, helium, argon and the like. This catalyst component when combined with an organoaluminum halide results in a very active vanadium coordination catalyst. The vanadium oxide has the formula:

$$V_2O_n$$ 

wherein $n$ is 3 to 5. The organophosphate has the formula:

$$(RO)_3P=O$$

wherein R is an alkyl or an alkyl ether having 1 to 16 carbon atoms or an aryl having up to 16 carbon atoms or mixtures thereof.

The vanadium coordination catalysts of this invention are obtained by using the vanadium organophosphate composition described in the paragraph above with at least one organoaluminum halide reducing compound in the presence of an inert liquid organic medium. Representative types of organoaluminum compounds include dialkylaluminum monohalides; alkylaluminum dihalides; and aluminum alkyl, cycloalkyl or aryl sesquihalides. Particularly preferred organoaluminum halide compounds in combination with the vanadium organophosphates of this invention include diethylaluminum monochloride and ethylaluminum sesquichloride. Other organoaluminum compounds suitable for the coordination catalyst of this invention include methyl, propyl and isobutyl aluminum chlorides. Although the relative proportions of the vanadium organophosphates and the organoaluminum halide compounds can vary widely and one of ordinary skill in the art can readily determine the optimum proportions for specific vanadium and aluminum compounds by routine experimentation, one would generally operate with an Al:V molar ratio in the range of about 1:1 to 20:1. The Al:V molar ratio for the preferred vanadium and aluminum compounds is in the range of about 4:1 to 10:1.

The vanadium coordination catalysts of this invention are especially useful in the preparation of polymers of ethylene, propylene and similar alpha-olefins having the formula: R—CH=CH₂ wherein R is hydrogen or a hydrocarbon radical, particularly an unsaturated alkyl hydrocarbon radical having 1 to 8 carbon atoms, e.g., butene-1; hexene-1; 4-methylpentene-1; heptene-1; 5-methylhexene-1; octene-1; 4-ethylhexene-1; 1-nonene; 1-decene, and dienes, e.g., butadiene and the like. The catalyst of this invention is especially useful in the copolymerization of ethylene and propylene to yield rubbery products and the production of unsaturated, sulfur-vulcanizable, rubbery terpolymers of ethylene and propylene and a nonconjugated diene, e.g., dicyclopentadiene (DCP); methylcyclopentadiene; methylene norbornene (MNB); 1,5-cyclooctadiene; 1,4-hexadiene; 1,5-cyclooctadiene, or other copolymerizable dienes. The unique features of the vanadium coordination catalyst of this invention are high productivity of the catalyst in terms of the amount of product per pound of catalyst, low cost, ease of handling and storage, and good solubility and stability in solution.

PREFERRED EMBODIMENTS OF THIS INVENTION

In a preferred embodiment of this invention, the vanadium-coordination catalyst comprises an admixture of an organoaluminum halide and the reaction product of vanadium pentoxide and the organophosphate having the formula set forth above in Summary of the Invention wherein R is an alkyl having 1 to 8 carbon atoms in the presence of oxygen or an oxygen-containing gas, e.g., air. It is preferred that the oxygen be present during this reaction in amounts in excess of the stoichiometrical minimum. The reaction takes place at a temperature in the range of about 50° to 200° C. and at subatmospheric to atmospheric or above for a period of ½ hour to several days. At temperatures below 50° C., little if any reaction takes place and above 200° C. the products have a tendency to decompose. The molar ratio of the organophosphate to the vanadium oxide in the reactants is about 4:1, although the reaction can be carried out in the molar range of about 1:1 to 6:1. An excess amount of the organophosphate is generally added to keep the product in solution.

To obtain the preferred vanadium organophosphate component, 1 mole of vanadium pentoxide is reacted with at least 4 moles of trimethyl, triethyl, tripropyl or tributyl phosphate or mixtures thereof at a temperature in the range of 150° to 200° C. at atmospheric pressure for about 5 to 20 hours with at least 3/2 moles of oxygen, the stoichiometrical minimum amount for the theoretical equation of this reaction which can be represented as follows:

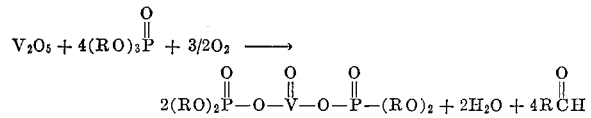

The composition of this vanadium organophosphate reaction product is fully described in the copending application Ser. No. 836,169 filed June 24, 1969, the description of which is incorporated herein by reference. This copending application also sets forth details of the synthesis described above as well as alternate routes to the vanadium organophosphate composition. However, sufficient details of the synthesis route for forming the preferred vanadium organophosphate composition of the present invention to enable one skilled in the art to practice this invention are set forth in the examples below.

The reaction mixture from the synthesis route described above is cooled, the excess solid reactants are removed, for example, by filtration, and the filtrate is stripped, preferably under a vacuum to avoid decomposition of the product. The resultant impure liquid product can then be solubilized in a suitable solvent, filtered, vacuum stripped to remove the solvent and then crystallized to yield a crystalline product. The crystallization takes place by cooling the stripped product or by other known techniques. Suitable solvents for the crystallization of the vanadium organophosphate of this invention include low boiling paraffinic hydrocarbons such as pentane, hexane, heptane and the like, or aromatics such as benzene, toluene and the like.

Inert liquid organic media, i.e., liquids which do not interfere with the desired polymerization reaction, which are suitably present in the polymerization reactor with the vanadium coordination catalysts of this invention include tetrachloroethylene; aromatic solvents such as benzene, toluene and xylenes; saturated aliphatic hydrocarbon and cycloaliphatic hydrocarbons such as cyclohexane, butane, neopentane, isopentane, n-pentane, cyclopentane, hexane, heptane, methylcyclohexane, 2,2,4 - trimethylpentane, octane, and nonane; chlorinated aliphatic hydrocarbons; chlorinated cycloaliphatic hydrocarbons such as carbon tetrachloride, ethyl chloride, methyl chloride, 1,2-dichloroethane and trichloromonofluoromethane; and the organophosphates as described above. Particularly effective solvents for the preferred vanadium coordination catalysts of this invention are saturated aliphatic and cycloaliphatic hydrocarbons especially n-hexane, n-heptane, cyclohexane and cycloheptane.

The vanadium coordination catalysts of this invention are employed by contacting them with one or more of the monomers described in Summary of the Invention at subatmospheric to above atmospheric pressure and at a temperature of about —50° C. to 100° C. Preferably the conditions for polymerizing these monomers comprise from about atmospheric pressure to about 15 atmospheres and a temperature of about —5° to 50° C. It has been found for the vanadium coordination catalysts of this invention that at temperatures above 25° C. the product yields tend to decrease at pressures in the range of about 25 to 125 p.s.i.g.

The polymerization reaction is arrested and the product is precipitated out of solution by the addition of a non-solvent such as an alcohol. The product is then washed, filtered, and dried. An antioxidant, such as butylated hydroxytoluene, is optionally added to the product prior to the recovery step to avoid its oxidation and degradation.

The polymerization reaction can either be carried out in a batch or continuous operation. In the continuous process, the solvent, vanadium coordination catalyst and monomers are continuously introduced into a reaction zone which is equipped with means for agitation at a sufficient rate to provide the residence time required for the desired polymer concentration in the reaction zone effluent.

The vanadium coordination catalysts of this invention are especially useful in the preparation of EP and EPDM rubbers. The ethylene content of these rubbery products ranges from between about 20 and 70 weight percent and correspondingly, the propylene content ranges from between 30 and 80 weight percent. In the case of EPDM, the amount of diene should exceed 1 weight percent of the final product and preferably ranges between about 3 and 30 weight percent. Accordingly, the ethylene and propylene in the final terpolymer ranges between about 70 and 97 weight percent.

The foregoing EP and EPDM rubbers are prepared by reacting, preferably in the presence of hydrogen or other known chain transfer agents, a monomeric mixture of ethylene and propylene comprising from about 20 to 70 weight percent ethylene and 30 to 80 weight percent propylene and, in the case of EPDM rubber, the nonconjugated diene in a reaction zone in the presence of an inert solvent at a temperature of —5° to 50° C. with a catalytic amount of the vanadium coordination catalyst of this invention.

The examples below illustrate the methods of preparation of the compositions of the present invention and their use in polymerization.

EXAMPLE 1

Preparation of vanadium organophosphate catalyst component in the presence of excess oxygen The vanadium organophosphate catalyst component was prepared by charging 18.2 grams (0.1 mole) of finely divided vanadium pentoxide and 182 grams (1 mole) of triethyl phosphate to a glass-bowl reactor equipped with a condenser, stirrer and a means for adding air. Air was bubbled into the reactants during the entire reaction. The reactants were heated at reflux temperatures of about 180° C. and atmospheric pressure for 4 hours. After the resulting product mixture was cooled to room temperature and 10 grams of the excess vanadium pentoxide were filtered off, representing 45% by weight conversion of the vanadium in the reaction mixture to the desired product, the filtrate was vacuum stripped at 10 mm. Hg and 130° C. The stripped liquid was cooled to room temperature, 200 ml. of benzene were added and the solution was heated to 50° C. for 1 hour. The resulting mixture was filtered, the filtrate was vacuum stripped at 10 mm. Hg and 120° C., and a thick blue syrup was formed. The syrup was cooled to room temperature and 150 ml. of n-hexane were added to the syrup to precipitate out the product, over a two-hour period. 23.3 grams of light blue solid product were recovered after filtration and after the blue syrup was evaporated to 10 ml. An additional product was crystallized from the remaining 10 ml. of syrup on standing for 2 days.

EXAMPLE 2

Use of vanadium organophosphate catalyst component of Example 1 in preparation of EP rubber at 25° C.

A stirred glass-bowl reactor was charged with 30 p.s.i. of ethylene, 1300 cc. of heptane and 320 cc. of liquid propylene. During the course of the reaction, 0.31 gram of the vanadium organophosphate compound obtained from Example 1 dissolved in 30 cc. of benzene and 1.2 grams of ethylaluminum sesquichloride dissolved in 30 cc. of n-heptane were continuously metered into the reactor. The reaction mixture was maintained at a temperature of 25° C. and a constant pressure of 60 p.s.i.g. with gas mixture comprising 60 mole percent ethylene and 40 mole percent propylene. The reaction was terminated and the ethylene/propylene copolymer was precipitated out of solution by the addition of an excess amount of isopropyl alcohol after a total reaction time of 35 minutes. The resulting copolymer product was filtered, dried and weighed. The yield of the ethylene/propylene copolymer product was 119 grams.

EXAMPLE 3

Use of vanadium tetrachloride in the preparation of EP rubber at 25° C. as a control A control run was made at the identical operating conditions as described above, except that in place of the vanadium organophosphate catalyst component of this invention, vanadium tetrachloride ($VCl_4$) was employed in an amount of 0.16 gram dissolved in 30 cc. of benzene. The difference in the amount of the vanadium organophosphate employed versus that of the vanadium tetrachloride was the amount necessary to put the two catalysts on the basis of equivalent vanadium contents. The yield of the ethylene/propylene copolymer product for the control run was 112 grams.

EXAMPLE 4

Use of vanadium organophosphate of Example 1 in preparation of EP rubber at 40° C.

Example 2 above was repeated except that the reaction temperature was increased to 40° C. The yield when operating with the catalyst of this invention was 50 grams.

EXAMPLE 5

Preparation of vanadium organophosphate catalyst component in absence of oxygen

The procedure set forth under Example 1 was used to prepare the vanadium organophosphate catalyst component except that no air or other oxygen-containing gas was added during the synthesis. The only oxygen present was that remaining in the vapor space above the liquid reactants in the reactor. The same light blue crystalline product was obtained in this example that was obtained by the procedure of Example 1.

EXAMPLE 6

Use of vanadium organophosphate catalyst component of Example 5 in preparation EP rubber at 25° C. as a control A control run was made employing the identical operating procedure as described under Example 2 except that 0.31 gram of the vanadium organophosphate catalyst component of Example 5 dissolved in 30 cc. of benzene were used. The yield of the ethylene/propylene copolymer product from this control run was 92 grams or about 30 percent by weight less than the amount produced in Example 2 employing the catalyst of this invention.

EXAMPLE 7

Use of a blend of the vanadium organophosphate catalyst components of Examples 1 and 5 in the preparation of EP rubber at 25° C.

The same operating procedure was followed in this example as that described under Example 2 above except that 0.31 gram of a blend of vanadium organophosphate catalyst components dissolved in 30 cc. of benzene were used. The blend consisted of 18.75 weight percent of the catalyst component prepared in accordance with the procedure set forth under Example 1 and 81.25 weight percent of the component of that of Example 5. The yield of the ethylene/propylene copolymer product from this polymerization run was 103 grams or about 16 percent by weight less than the amount produced in Example 2 employed 100% rather than 18.75% of the catalyst of this invention.

EXAMPLE 8

Use of the vanadium organophosphate catalyst component of Example 5 in the preparation of EPDM rubber as a control A feed vessel was charged with 2250 cc. of n-heptane and 1.41 grams of ethylaluminum sesquichloride. A glass-bowl reactor was flushed with ethylene and charged with 30 p.s.i. of ethylene, 750 cc. of the mixture from the feed vessel and 300 cc. of liquid propylene. A continuous feed stream of ENB dissolved in 30 cc. of n-heptane and the same vanadium organophosphate catalyst component used in Example 6 above dissolved in 30 cc. of benzene were continuously added during the course of this continuous run in the presence of hydrogen at a pressure of about 100 p.s.i.g. and a temperature of 25° C. After a 30 minute initiation period, the liquid level in the reactor was maintained at 1300 cc. by slowly discharging the contents.

The total reaction time for the continuous run was 90 minutes. The total feed added during this period and the resulting EPDM rubber properties are indicated in Table II below:

TABLE II

Total feed:
    Vanadium organophosphate catalysts—0.27 gram
    Ethylaluminum sesquichloride—1.41 grams
    Hydrogen—3.6 liters
    Ethylene—99 liters
    Propylene—900 cc.
    Ethylidene norbornene—18 cc.
    n-Heptane—2250 cc.
EPDM product:
    Yield—110 grams
    Productivity—407 grams of product/gm. catalyst

EXAMPLE 9

Use of the blend of the vanadium organophosphate catalyst components of Examples 1 and 5 in the preparation of EPDM rubber The same operating procedure was followed in this example as that described under Example 8 above except that 0.27 gram of the same blend of the vanadium organophosphate catalyst components used in Example 7 above dissolved in 30 cc. of benzene were used. The yield of EPDM rubber product was 147 grams of a productivity of 545 grams of product per gram of vanadium organometallic catalyst. This represents an increase in productivity of about 34% over that produced in control Example 8.

The foregoing examples have illustrated the unexpectedly high polymerization activity of a vanadium coordination catalyst when the vanadium organophosphate component thereof is prepared in the presence of an excess amount of oxygen.

What is claimed is:

1. A catalyst composition comprising the reaction product of a vanadium oxide having the formula:

wherein $n$ is 3 to 5; an organophosphate having the formula:

wherein R is an alkyl having 1 to 16 carbon atoms, an alkyl ether having 1 to 16 carbon atoms, an an aryl having up to 16 carbon atoms or mixtures thereof and at least 3/2 moles of oxygen per mole of $V_2O_n$ at a temperature in the range of about 50° to 200° C. and an organoaluminum halide.

2. The catalyst composition of claim 1 wherein *n* is 5.

3. The catalyst composition of claim 1 wherein R is an alkyl having 1 to 8 carbon atoms.

4. The catalyst composition of claim 1 wherein the reaction product comprises one mole of said vanadium oxide and at least about 4 moles of said organophosphate.

5. The catalyst composition of claim 1 wherein the Al:V molar ratio is in the range of about 1:1 to 20:1.

6. A process for preparing polymers of at least one alpha-olefin which comprises reacting said alpha-olefin in the presence of a solvent at a temperature of about −50° to 100° C. with a catalytic amount of the catalyst composition of claim 1.

7. The process of claim 6 wherein said alpha-olefin is ethylene, propylene or mixtures thereof.

8. A process for preparing a polymer which comprises reacting a mixture comprising about 70 to 99% by weight of at least one alpha-olefin and about 1 to 30% by weight of at least one nonconjugated diene in the reaction zone in the presence of an inert solvent at a temperature of about −5° to 50° C. with a catalytic amount of the catalyst composition of claim 1.

9. A process for preparing a terpolymer of ethylene/propylene/diene monomers which comprises reacting a monomeric mixture comprising from about 20 to about 70 parts by weight of ethylene, from about 30 to about 80 parts by weight of propylene and from about 1 to about 30 parts by weight of a nonconjugated diene in a reaction zone in the presence of an inert solvent at a temperature of about −5° to 50° C. with a catalytic amount of the catalyst composition of claim 1.

10. A process for producing a catalyst component which comprises the following steps:

(a) reacting one mole of a vanadium oxide having the formula:

$$V_2O_n$$

wherein *n* is 3 to 5 with at least 4 moles of an organophosphate having the formula:

wherein R is an alkyl having 1 to 16 carbon atoms, an alkyl ether having 1 to 16 carbon atoms, and an aryl having up to 16 carbon atoms or mixtures thereof and at least 3/2 moles of oxygen which is added directly to the resulting liquid phase at a temperature in the range of about 50° to 200° C.;

(b) separating the liquid phase from the resulting product mixture; and (c) recovering from the liquid phase a solid, substantially crystalline product comprising said catalyst component.

11. The process as in claim 10 wherein an organoaluminum halide is combined with said catalyst component.

12. The process as in claim 10 wherein *n* is 5.

13. The process as in claim 10 wherein R is an alkyl having 1 to 8 carbon atoms.

14. A process for preparing polymers of at least one alpha-olefin which comprises reacting said alpha-olefin in the presence of a solvent at a temperature of about −50° C. to 100° C. with a catalytic amount of the catalyst composition prepared by the process of claim 11.

15. The process of claim 14 wherein said alpha-olefin is ethylene, propylene or mixtures thereof.

16. A process for preparing a polymer which comprises reacting a mixture comprising about 70 to 99% by weight of at least one alpha-olefin and about 1 to 30% by weight of at least one nonconjugated diene in the reaction zone in the presence of an inert solvent at a temperature of about −5° to 50° C. with a catalytic amount of the catalyst composition prepared by the process of claim 11.

17. A process for preparing a terpolymer of ethylene/propylene/diene monomers which comprises reacting a monomeric mixture comprising from about 20 to about 70 parts by weight of ethylene, from about 30 to about 80 parts by weight of propylene and from about 1 to about 30 parts by weight of a nonconjugated diene in a reaction zone in the presence of an inert solvent at a temperature of about −5° to 50° C. with a catalytic amount of the catalyst composition prepared by the process of claim 11.

18. A process for producing a catalyst composition which comprises the following steps:

(a) reacting one mole of $V_2O_5$ with at least 4 moles of a phosphate of trimethyl, triethyl, tripropyl, tributyl or mixtures thereof and with at least 3/2 mole of oxygen which is added directly to the resulting liquid phase at a temperature in the range of 150° to 200° C.;

(b) separating the liquid phase from the resulting product mixture;

(c) recovering from the liquid phase a solid, substantially crystalline product comprising said catalyst component; and (d) combining an organoaluminum chloride with said catalyst component in an Al:V molar ratio in the range of about 4:1 to 10:1.

19. The process of claim 18 wherein said organoaluminum chloride is dialkylaluminum monochloride, alkylaluminum dichloride, aluminum alkyl sesquichloride, aluminum cycloalkyl sesquichloride, aluminum aryl sesquichloride or mixtures thereof and wherein said alkyl has 1 to 4 carbon atoms.

20. A process for preparing an ethylene/propylene copolymer which comprises reacting a monomeric mixture comprising from about 20 to 70 weight percent ethylene and from about 30 to about 80 weight percent propylene in a reaction zone in the presence of an inert solvent at a temperature of about −5° to 50° C. with a catalytic amount of the catalyst composition prepared by the process of claim 18.

21. A process for preparing a terpolymer of ethylene/propylene/diene monomers which comprises reacting a monomeric mixture comprising from about 20 to about 70 parts by weight of ethylene, from about 30 to about 80 parts by weight of propylene and from about 1 to about 30 parts by weight of a nonconjugated diene in a reaction zone in the presence of an inert solvent at a temperature of about −5° to 50° C. with a catalytic amount of the catalyst composition prepared by the process of claim 18.

References Cited

UNITED STATES PATENTS 3,427,257  2/1969  Bayer et al. _____ 252—431(P)
3,488,334  1/1970  Bayer et al. ____ 260—94.9X(C)

FOREIGN PATENTS 626,206  8/1961  Canada _____ 260—94.9B

JOSEPH L. SCHOFER, Primary Examiner

A. HOLLER, Assistant Examiner

U.S. Cl. X.R.

252—428, 431P; 260—88.2R, 93.7, 94.9B, 94.9C